(12) United States Patent
Schwalbe et al.

(10) Patent No.: US 10,513,294 B2
(45) Date of Patent: Dec. 24, 2019

(54) BOXED PLATE CONSTRUCTION FRAME WITH PLATES OF VARYING THICKNESSES

(71) Applicant: CNH Industrial America LLC, New Holland, PA (US)

(72) Inventors: Blaine A. Schwalbe, Valders, WI (US); Brian Pilney, West Bend, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 109 days.

(21) Appl. No.: 15/805,399

(22) Filed: Nov. 7, 2017

(65) Prior Publication Data

US 2019/0135347 A1 May 9, 2019

(51) Int. Cl.
| | | |
|---|---|---|
| *B62D 21/18* | (2006.01) | |
| *B62D 21/10* | (2006.01) | |
| *B62D 25/08* | (2006.01) | |
| *B62D 65/02* | (2006.01) | |
| *B62D 27/02* | (2006.01) | |
| *B62D 21/02* | (2006.01) | |
| *A01M 7/00* | (2006.01) | |
| *A01C 23/00* | (2006.01) | |

(52) U.S. Cl.
CPC ........... *B62D 21/18* (2013.01); *A01M 7/0082* (2013.01); *B62D 21/02* (2013.01); *B62D 21/10* (2013.01); *B62D 21/186* (2013.01); *B62D 25/082* (2013.01); *B62D 27/023* (2013.01); *B62D 65/024* (2013.01); *A01C 23/00* (2013.01); *A01M 7/0053* (2013.01); *A01M 7/0057* (2013.01); *B60Y 2200/224* (2013.01)

(58) Field of Classification Search
CPC .............. A01M 7/0057; A01M 7/0082; A01M 7/0053; B62D 21/02; B62D 27/023; B62D 65/024; B62D 221/10; B62D 21/18; B60Y 2200/224
See application file for complete search history.

(56) References Cited

U.S. PATENT DOCUMENTS

| | | | | |
|---|---|---|---|---|
| 1,723,518 A | * | 8/1929 | Murray, Jr. ............ | B62D 21/02 280/796 |
| 4,093,253 A | * | 6/1978 | Lehr ...................... | B62D 21/02 280/789 |
| 4,360,143 A | * | 11/1982 | Beckman ............... | B60G 7/001 228/155 |

(Continued)

FOREIGN PATENT DOCUMENTS

WO    2013092272    6/2013

*Primary Examiner* — Karen Beck
(74) *Attorney, Agent, or Firm* — Rebecca L. Henkel; Rickard K. DeMille

(57) ABSTRACT

A chassis frame including a first section and a second section. The first section includes a top plate having a first thickness, a bottom plate, and a plurality of side plates extending from the top plate to the bottom plate. The second section includes a top plate having a second thickness, a bottom plate, and a plurality of side plates extending from the top plate to the bottom plate. The first section and the second section are joined at least one transition joint. Each transition joint includes a protrusion configured to engage a pocket. Each pocket is defined by angular edges of the top and bottom plates of the first section. Each protrusion defined by angular edges of the top and bottom plates of the second section.

16 Claims, 8 Drawing Sheets

(56) References Cited

U.S. PATENT DOCUMENTS

| | | | |
|---|---|---|---|
| 5,322,208 A * | 6/1994 | Hinrichs | B23K 9/025 228/182 |
| 6,138,427 A | 10/2000 | Houghton | |
| 6,578,909 B1 * | 6/2003 | Reed | B62D 25/04 296/203.01 |
| 6,966,501 B2 | 11/2005 | Wubben et al. | |
| 8,091,799 B2 * | 1/2012 | Honermann | A01B 73/02 239/165 |
| 8,794,346 B2 | 8/2014 | Blunier et al. | |
| 8,887,470 B2 | 11/2014 | Werner et al. | |
| 9,045,039 B2 | 6/2015 | Ringer et al. | |
| 9,155,295 B2 | 10/2015 | Bouten | |
| 9,193,537 B2 | 11/2015 | Hannikainen | |
| 10,202,149 B1 * | 2/2019 | Johnson | B62D 21/02 |
| 10,226,965 B1 * | 3/2019 | Schwalbe | B60B 35/109 |
| 2012/0273063 A1 * | 11/2012 | Honermann | A01B 59/00 137/342 |
| 2013/0028659 A1 | 1/2013 | Leitner et al. | |
| 2014/0292031 A1 * | 10/2014 | Nydam | B62D 25/025 296/187.12 |
| 2015/0375806 A1 * | 12/2015 | Gallagher | B62D 33/077 296/35.1 |
| 2016/0243990 A1 * | 8/2016 | Portney | B60R 3/00 |
| 2016/0297479 A1 * | 10/2016 | Ritschel | B62D 27/023 |
| 2017/0096171 A1 * | 4/2017 | Frost | B60R 19/18 |
| 2017/0129545 A1 * | 5/2017 | Schauerte | B62D 27/023 |
| 2018/0201320 A1 * | 7/2018 | Knittel | B62D 27/023 |
| 2018/0215419 A1 * | 8/2018 | Stojkovic | B62D 25/04 |
| 2018/0222536 A1 * | 8/2018 | Frehn | B21D 22/022 |
| 2018/0244321 A1 * | 8/2018 | McCloud | B62D 21/20 |
| 2018/0304340 A1 * | 10/2018 | Tyan | B21D 47/01 |

\* cited by examiner

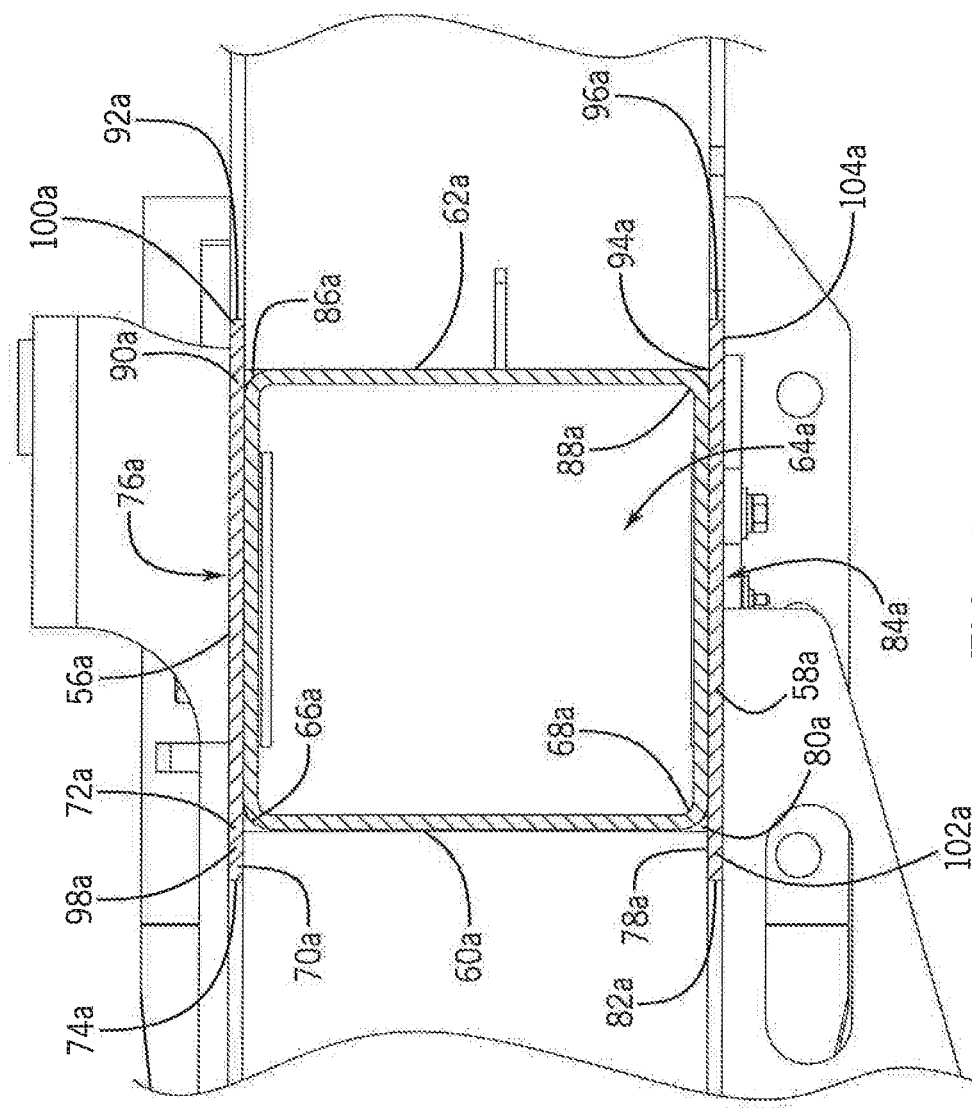

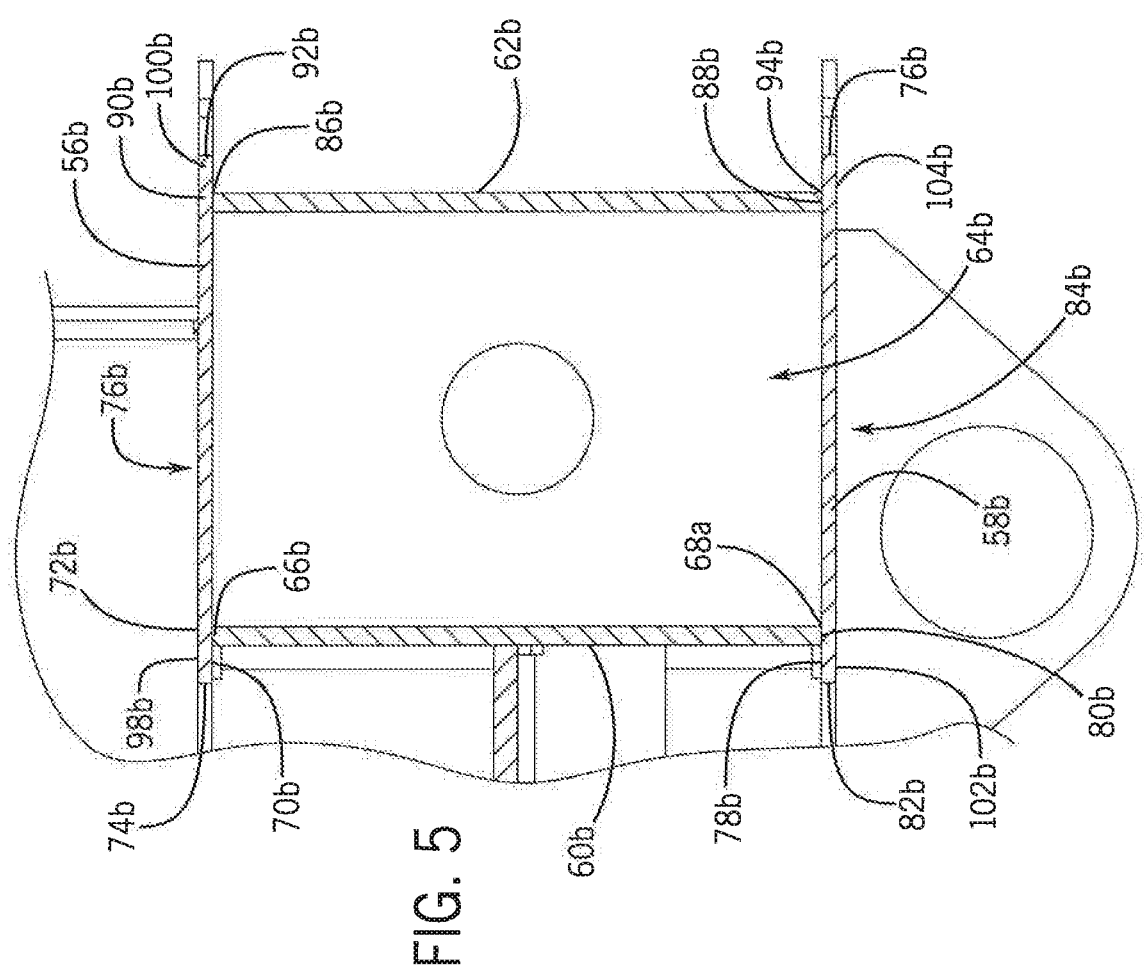

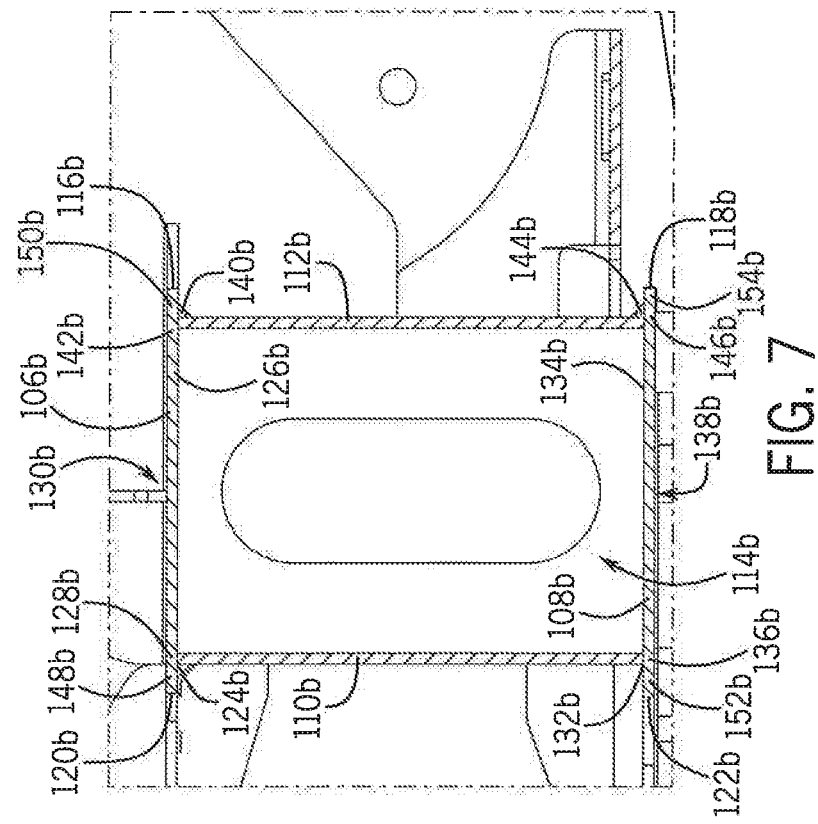
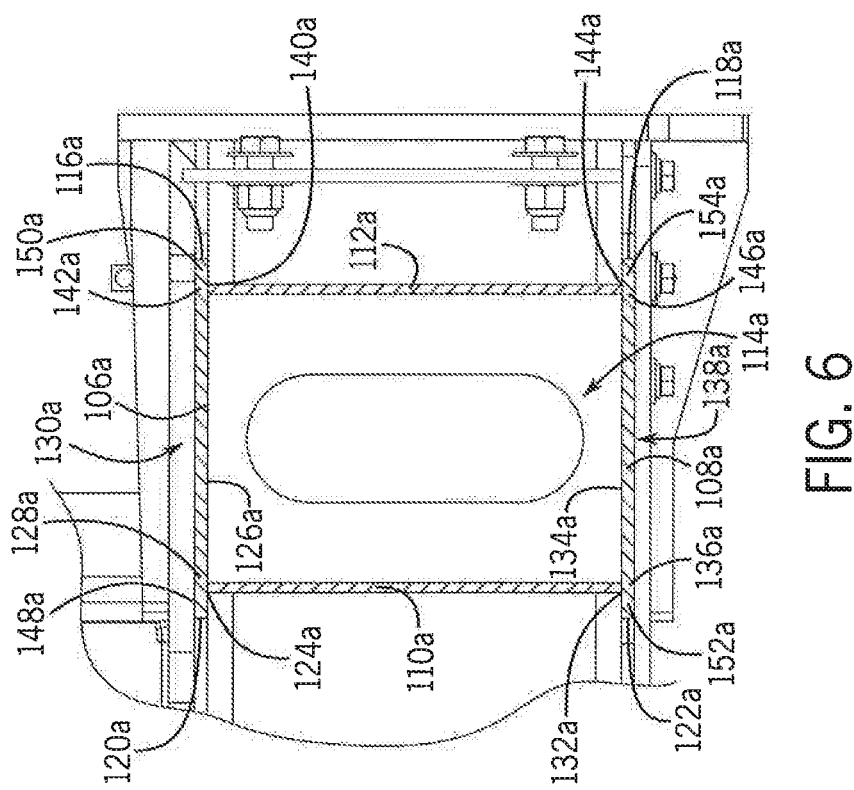

BOXED PLATE CONSTRUCTION FRAME WITH PLATES OF VARYING THICKNESSES

FIELD OF THE INVENTION

The invention relates generally to agricultural product application equipment such as self-propelled sprayers and, in particular, to a boxed plate construction frame with plates of varying thicknesses based on the strength needs at the respective different portions of the chassis frame.

BACKGROUND OF THE INVENTION

High-clearance spreaders are getting larger and heavier over time to allow for carrying longer booms that provide increased coverage in a single pass. High-clearance sprayers are also getting more complex, with accessories that improve machine efficiency and user comfort. These large high-clearance sprayers require larger and stronger frames to support the sprayer itself and its various accessories.

In order to provide sufficient strength and mounting locations for components and accessory-supporting brackets, high-clearance sprayer frames are currently made in a ladder-style configuration made from numerous large sections of tubing to which various open channels, plates, and/or other webs of materials may be attached, such as in a vertical stack that adds to the overall height of the frame. These ladder-style tube frames can be relatively heavy and have numerous individual components that can require substantial amounts of time for fit-up and welding while fabricating.

There is a need for a chassis frame including plate segments at different portions of the chassis frame that have different thicknesses in order to only provide additional strength at respective portions of the chassis frame. The boxed plate constructed frame of the current invention is wider, shorter, and lighter than the current ladder-style tube frame.

SUMMARY OF THE INVENTION

The present invention is directed to a boxed plate construction frame with plates of varying thicknesses based on the strength needs at the respective different portions of the chassis frame. The boxed plate constructed frame provides thicker material only where extra strength is needed.

According to one aspect of the invention, a chassis frame including a first section and a second section. The first section includes a top plate having a first thickness, a bottom plate, and a plurality of side plates extending from the top plate to the bottom plate. The second section includes a top plate having a second thickness, a bottom plate, and a plurality of side plates extending from the top plate to the bottom plate. The first section and the second section are joined at least one transition joint. Each transition joint includes a protrusion configured to engage a pocket. Each pocket may be defined by angular edges of the top and bottom plates of the first section. Each protrusion defined by angular edges of the top and bottom plates of the second section.

In accordance with another aspect of the invention, the first thickness may be greater than the second thickness. For example, the first thickness is 0.25 inch and the second thickness is 0.1875 inch.

In accordance with yet another aspect of the invention, the angular edges of the top and bottom plates of the first section are aligned with the angular edges of the top and bottom plates of the second section so as to be in contact with each other.

In accordance with another aspect of the invention, the first section of the chassis frame may be a portion of the chassis frame supporting a boom of the agricultural sprayer. The second section of the chassis frame may be a portion of the chassis frame supporting an engine compartment of the agricultural sprayer.

According to another aspect of the invention, a method of manufacturing a chassis frame for an agricultural sprayer includes forming a first section of the chassis frame, forming a second section of the chassis frame, and joining the first section and the second section at a transition point formed by angular edges of the top and bottom plates of the first section aligned with angular edges of the top and bottom plates of the second section. Forming the first section includes providing a top plate having a first thickness, providing a bottom plate spaced apart from the top plate, and coupling a plurality of side plates to the top plate at a first end and orienting the plurality of side plates to extend between the top plate and the bottom plate. Forming the second section includes providing a top plate having a second thickness, providing a bottom plate spaced apart from the top plate, and coupling a plurality of side plates to the top plate at a first end and orienting the plurality of side plates to extend between the top plate and the bottom plate.

In accordance with another aspect of the invention, joining the first section and the second section at a transition point includes creating a transition point pocket defined by the angular edges of the top and bottom plates of the second section of chassis frame, creating a transition point protrusion defined by the angular edges of the top and bottom plates of the first section of chassis frame, and engaging the transition point protrusion with the transition point pocket.

In accordance with yet another aspect of the invention, joining the first section and the second section at a transition point may further include aligning the angular edges of the top and bottom plates of the transition point pocket with the angular edges of the top and bottom plates transition point protrusion to form a seam between the angular edges, coupling the top plate of the transition point pocket to the top plate of the transition point protrusion by way of an upper joining plate disposed on a bottom surfaces of the top plates, and coupling the bottom plate of the transition point pocket to the bottom plate of the transition point protrusion by way of a lower joining plate disposed on a top surface of the bottom plates.

In accordance with another aspect of the invention, the first thickness may be greater than the second thickness. For example, the first thickness may be 0.25 inch and the second thickness may be 0.1875 inch.

According to yet another aspect of the invention, a chassis frame includes a front portion and a rear portion coupled to the front portion of the chassis frame at least one transition joint. The front portion of the chassis frame includes a top plate having a first thickness, a bottom plate spaced apart from the top plate, and a plurality of side plates extending from the top plate to the bottom plate. The rear portion of the chassis frame includes a top plate having a second thickness less than the first thickness, a bottom plate spaced apart from the top plate, and a plurality of side plates extending from the top plate to the bottom plate. Each transition joint includes a pocket defined by angular edges of the rear portion of the chassis frame and a protrusion defined by angular edges of the front portion of the chassis frame. The protrusion is configured to engage the pocket.

In accordance with another aspect of the invention, the pocket of each transition joint may be formed at a corner of the rear portion of the chassis frame at an end of the rear portion of the chassis frame adjacent the front portion of the chassis frame. In addition, the protrusion of each transition joint is formed at a corner of the front portion of the chassis frame at an end of the front portion of the chassis frame adjacent the rear portion of the chassis frame.

In accordance with yet another aspect of the invention, the first thickness may be 0.25 inch and the second thickness may be 0.1875 inch.

In accordance with another embodiment of the invention, a thickness of the bottom plate of the front portion of the chassis may be equal to the first thickness and a thickness of the bottom plate of the rear portion of the chassis may be equal to the second thickness.

In accordance with yet another aspect of the invention, each transition joint may include a seam between the angular edges of the rear portion of the chassis frame and the angular edges of the front portion of the chassis frame. A joining plate may be disposed along each seam to couple together the rear portion of the chassis frame and the front portion of the chassis frame.

BRIEF DESCRIPTION OF THE DRAWINGS

Preferred exemplary embodiments of the invention are illustrated in the accompanying drawings in which like reference numerals represent like parts throughout.

FIG. 4 is a cross-sectional view of a cross-member from a front portion of the chassis frame of FIG. 3, taken along line 4-4;

FIG. 5 is a cross-sectional view of a cross-member from a rear portion of the chassis frame of FIG. 3, taken along line 5-5;

FIG. 6 is a cross-sectional view of a side rail from the front potion of the chassis frame of FIG. 3, taken along line 6-6;

FIG. 7 is a cross-sectional view of a side rail from the rear portion of the chassis frame of FIG. 3, taken along line 7-7;

DETAILED DESCRIPTION OF THE PREFERRED EMBODIMENTS

Figure 1:
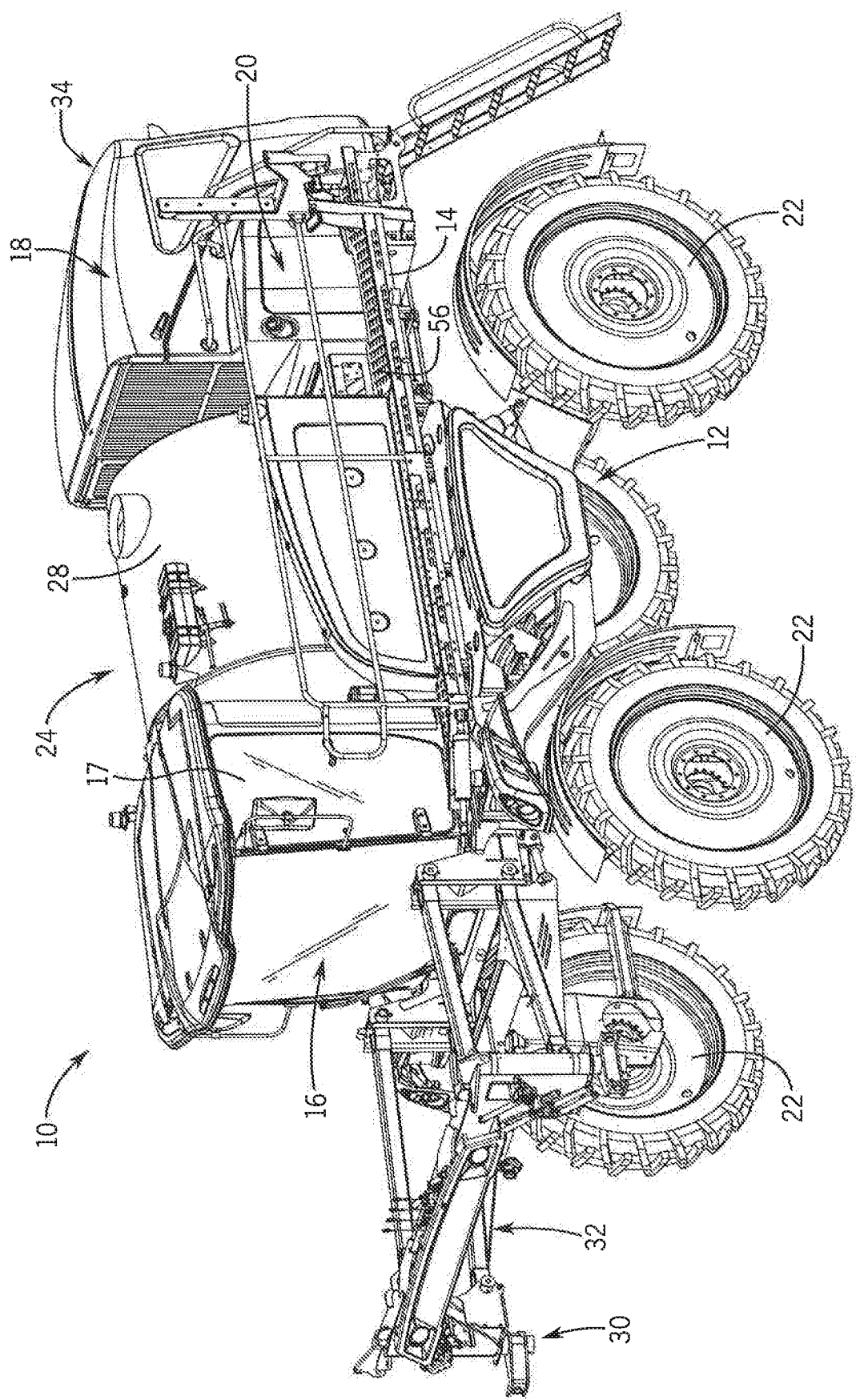
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

Figure 2:
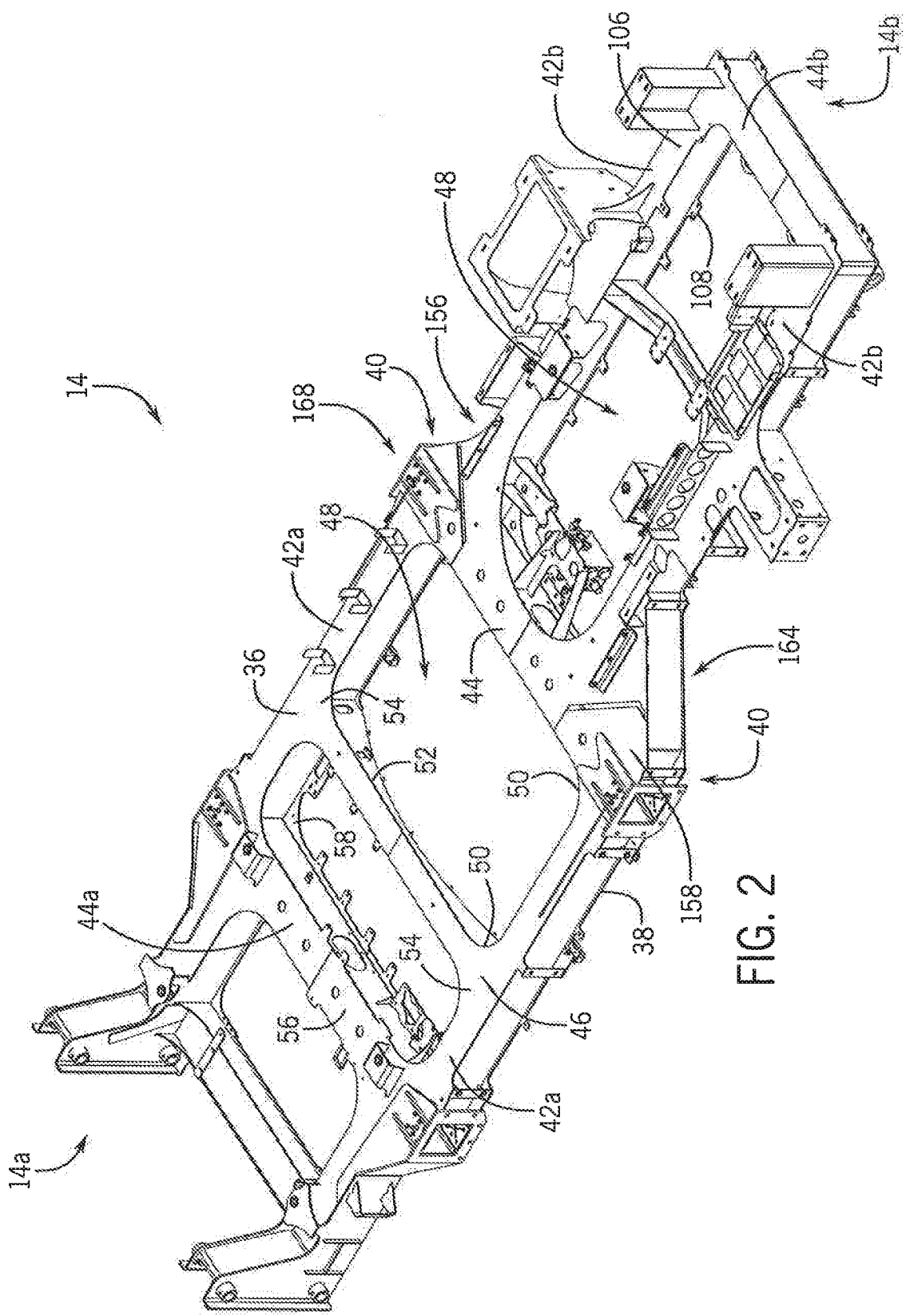
FIG. 2 is a perspective view of a chassis frame of the agricultural machine.
Figure 3:
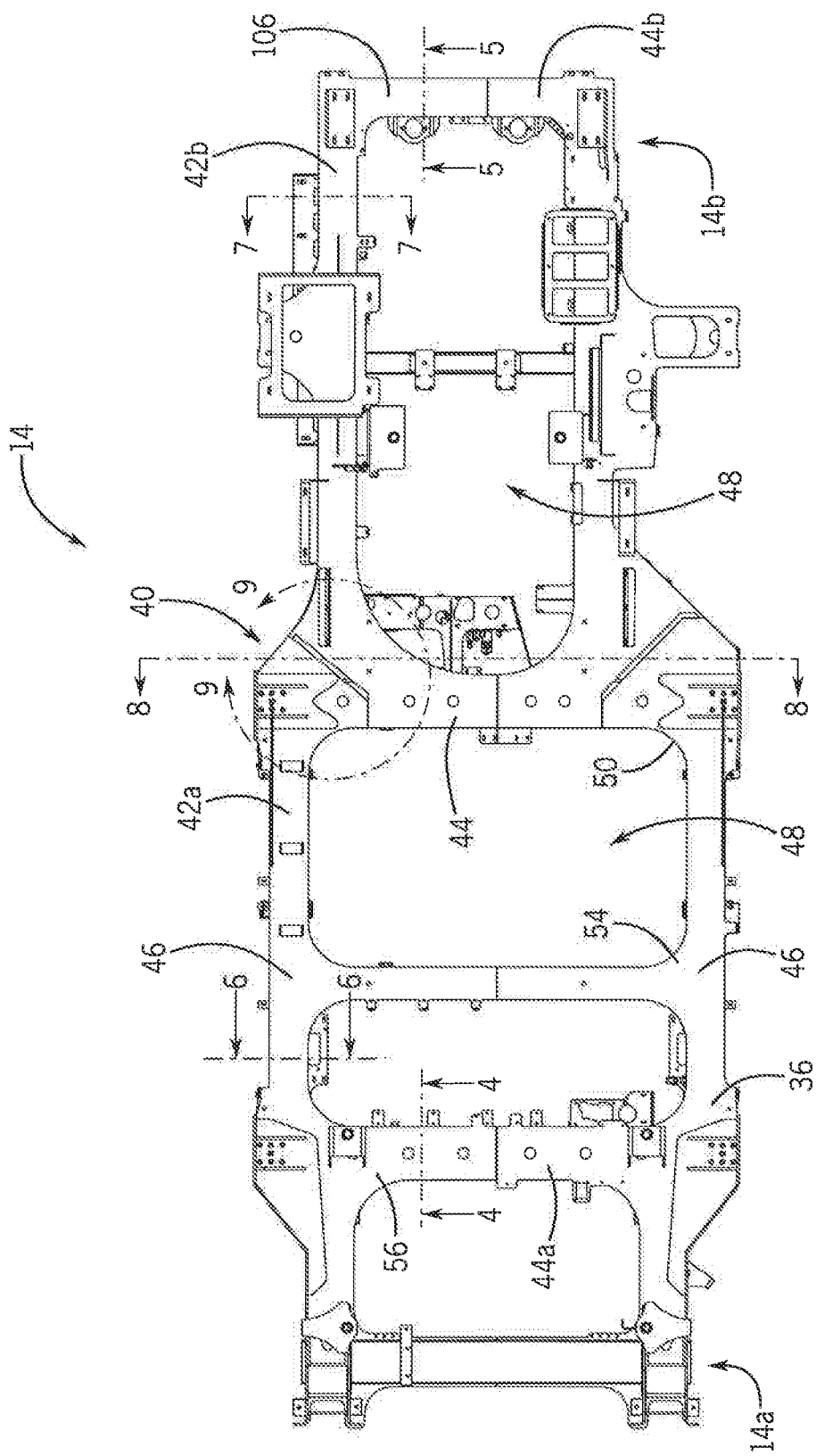
FIG. 3 is a top view of the chassis frame of FIG. 2.

FIGS. 2 and 3 depict perspective and top views, respectively, of the chassis frame 14 of the sprayer 10 without the operator cab 16, engine 18, hydraulic system 20, spray system 24, rinse tank 26, product tank 28, boom 30, lift arm assembly 32, and engine accessory system 34 removed, in order to further illustrate the chassis frame 14. As will be described in further detail below, the chassis frame 14 is a boxed plate constructed frame having top and bottom walls 36, 38, respectively. The top and bottom walls 36, 38 of the chassis frame 14 may be one of a number of thicknesses depending the strength needs of a specific section of the chassis frame 14.

The chassis frame 14 includes a front portion 14a, which is situated under and supports the weight of the operator cab 16, lift arm assembly 32, boom 30, rinse tank 26, product tank 28, and spray system 34 so that the front portion 14a defines a main support section of chassis frame 14. The chassis frame 14 further also includes a rear portion 14b, which is situated under and supports the weight of the engine 18 and engine accessory system 34 so that the rear portion 14b defines an engine support section of the chassis frame 14. The front and rear portions 14a, 14b of the chassis frame 14 are joined together at a plurality of transition joints 40, which will be described later in further detail.

The chassis frame 14 includes two (2) side rails 42 that run along the length of the chassis frame 14. As shown in FIGS. 2 and 3, the side rails 42 are oriented parallel to each other. While the representative embodiment of the invention illustrates the use of two (2) side rails 42, it is contemplated that other embodiments of the invention may use more or less than two (2) side rails 42.

The chassis frame 14 further includes a plurality of cross-members 44 that extend between the side rails 42 and are oriented perpendicular thereto. As show in FIGS. 2 and 3, the each cross-member 44 intersects with a side rail 42 at an intersection point 46. In varying embodiments of the invention, each cross-member 44 intersects with at least two (2) side rails 42 at respective intersection points 46. While the representative embodiment of the invention illustrates the top walls 36 of the chassis frame as being integral across adjacent side rails 42 and cross-members 44, it is also contemplated that each side rail 42 and cross-member 44 may distinct top walls 36 that re coupled together. It is contemplated that any number of cross-members 44 may be used in varying embodiments of the invention. In addition, while the representative embodiment of the invention depicts each cross-member 44 extending between respective side rails 42 and terminating at each intersection point 46, alternative embodiments of the invention may include cross-members 44 that extend beyond the intersection points 46 and the side rails 42.

The chassis frame 14 may also include a plurality of openings 48 throughout the chassis frame 14, which result in reduced weight. As shown in FIGS. 2 and 3, the intersection of side rails 42 and cross-members 44 results in openings surrounded by adjacent side rails 42 and cross-members 44. between the intersecting side rails and cross-members 44. Each intersection point 46 is associated with a corner 50 of at least one central opening 48. The perimeter 52 of each central opening 48 is defined by the edges of the adjacent side rails 42 and cross-members 44.

The top wall 36 of the chassis frame 14 may also include gusset portions 54. Each gusset portion 54 is located at a respective corner 50 of a central opening 48. As a result of the gusset portions 54, the corners or the central opening 48 are rounded in shape. In addition, the gusset portions 54 reduced force concentrations at the transition joints 40 between the side rails 42 and the cross-members 44. That is, the gusset portions 54 provide a greater surface area at each intersection joint 40 to spread the forces across a greater surface area.

The term permanently coupled, as used below and throughout the application, may refer to, but is not limited, a welded connection between elements.

Next, FIG. 4 illustrates a cross-sectional view of a cross-member 44a from the front portion 14a of the chassis frame 14 of FIG. 3, taken along line 4-4. As shown in the cross-sectional view of FIG. 4, the cross-member 44a of the chassis frame 14 is formed by a top plate 56a, a bottom plate 58a, a front side plate 60a, and a rear side plate 62a, which surround a hollow cavity 64a. The hollow cavity 64a of the cross-member 44a assists in reducing the weight of the chassis frame 14.

The front side plate 60a includes a first end 66a and a second end 68a. The first end 66a of the front side plate 60a is permanently coupled to a bottom surface 70a of the top plate 56a at a first location 72a between a first end 74a and a center point 76a of the top plate 56a. The second end 68a of the front side plate 60a is permanently coupled to a top surface 78a of the bottom plate 58a at a first location 80a between a first end 82a and a center point 84a of the bottom plate 58a. Similarly, the rear side plate 62a includes a first end 86a and a second end 88a. The first end 86a of the rear side plate 62a is permanently coupled to the bottom surface 70a of the top plate 56a at a second location 90a between a second end 92a and the center point 76a of the top plate 56a. The second end 88a of the rear plate 62a is permanently coupled to the top surface 78a of the bottom plate 58a at a second location 94a between a second end 96a and the center point 84a of the bottom plate 58a.

In light of the construction above, the top plate 56a includes a portion 100a adjacent the first end 74a of the top plate 56a that extends beyond the front side plate 60a. The top plate 56a also includes another portion 102a adjacent the second end 92a of the top plate 56a that extends beyond the rear side plate 62a. Similarly, the bottom plate 58a includes a portion 104a, which is adjacent the first end 82a of the bottom plate 58a and extends beyond the front side plate 60a, and a portion 106a, which is adjacent the second end 96a of the bottom plate 58a and extends beyond the rear side plate 62a.

In alternative embodiments of the invention, the front and rear side plates 60a, 62a may between the ends 74a, 92a, 82a, 96a, of the top and bottom plates 56a, 58a, respectively. In such alternative embodiments of the invention, the top and bottom plates 56a, 58a would not include portions 100a, 102a, 104a, 106a, respectively.

Now referring to FIG. 5, a cross-sectional view of a cross-member 44b from the rear portion 14b of the chassis frame 14 of FIG. 3, taken along line 5-5, is shown. Similar to the cross-members 44a, the cross-members 44b include a top plate 56b, a bottom plate 58b, a front side plate 60b, and a rear side plate 62b, which surround a hollow cavity 64b. As with the hollow cavity 64a, the hollow cavity 64b assists in reducing the weight of the chassis frame 14.

As discussed above, the construction of cross-member 44b is similar to the construction of cross-member 44a. The front side plate 60b includes a first end 66b and a second end 68b. The first end 66b of the front side plate 60b is permanently coupled to a bottom surface 70b of the top plate 56b at a first location 72b between a first end 74b and a center point 76b of the top plate 56b. The second end 68b of the front side plate 60b is permanently coupled to a top surface 78b of the bottom plate 58b at a first location 80b between a first end 82b and a center point 84b of the bottom plate 58b. Similarly, the rear side plate 62b includes a first end 86b and a second end 88b. The first end 86b of the rear side plate 62b is permanently coupled to the bottom surface 70b of the top plate 56b at a second location 90b between a second end 92b and the center point 76b of the top plate 56b. The second end 88b of the rear plate 62b is permanently coupled to the top surface 78b of the bottom plate 58b at a second location 94b between a second end 96b and the center point 84b of the bottom plate 58b.

In the representative embodiment of the invention, the top plate 56b includes a portion 100b adjacent the first end 74b of the top plate 56b, which extends beyond the front side plate 60b, and another portion 102b adjacent the second end 92b of the top plate 56b, which extends beyond the rear side plate 62b. Likewise, the bottom plate 58b includes a portion 104b adjacent the first end 82b of the bottom plate 58b, which extends beyond the front side plate 60b, and a portion 106b adjacent the second end 96b of the bottom plate 58b, which extends beyond the rear side plate 62b.

As described above with respect to cross-member 44a, the front and rear side plates 60b, 62b of cross-member 44b extend between the ends 74b, 92b, 82b, 96b of the top and bottom plates 56b, 58b, respectively. In these alternative embodiments of the invention, the top and bottom plates 56b, 58b would not include portions 100b, 102b, 104b, 106b, respectively.

In the representative embodiments of the invention shown in FIGS. 4 and 5, the top plate 56 and the bottom plate 58 are spaced apart from each other and oriented parallel or substantially parallel to each other. In addition, the front and rear side plates 60, 62 extend perpendicularly or substantially perpendicularly between the top and bottom plates 56, 58, as described above.

A thickness of the top plate 56a may differ than the thickness of the top plate 56b, based on the strength needs at the respective portions 14a, 14b of the chassis frame 14. A thickness of the bottom plates 58a, 58b may also differ to provide additional strength in areas of need. In one embodiment of the invention, the thickness of the top and bottom plates 56a, 58a may be greater than the thickness of the top and bottom plates 56b, 58b, in order to provide the additional strength necessary to support the boom 30 and other components at the front portion 14a of the chassis frame 14. In the representative embodiment of the invention, the thickness of the top and bottom plates 56a, 58a may be 0.25 inch (¼ inch), while the thickness of the top and bottom plates 56b, 58b may be 0.1875 inch (3/16 inch). However, it is also contemplated that the top and bottom plates 56b, 58b may have greater thicknesses that of top and bottom plates 56a, 58a in other embodiments of the invention.

In alternative embodiments of the invention, the thickness of the top plates 56a, 56b may be adjusted by the inclusion of additional plates. For instance, the top plates 56a, 56b may each include a number of plates welded together to provide the necessary thicknesses and strength, respectively. As such, the thickness of the top plates 56a, 56b may be adjusted at specific locations requiring extra strength across the chassis frame 14. While, in one instance, the top plate 56a may include a greater number of plates than the top plate 56b to provide a greater thickness and strength, it is also contemplated that the top plate 56b may include a greater number of plates than the top plate 56a, in other embodiments of the invention.

Next, FIG. 6 depicts a cross-sectional view of a side rail 42a from the front portion 14a of the chassis frame 14 of FIG. 3, taken along line 6-6. The cross-sectional view of the side rail 42a is similar in construction to the previously described cross-members 44a, 44b. The side rail 42a includes a top plate 106a spaced apart from and oriented parallel or substantially parallel to a bottom plate 108a, a first, inner side plate 110a extending between and oriented perpendicular or substantially perpendicular to the top and bottom plates 106a, 108a, and a second, outer side plate 112a extending between and oriented perpendicular or substantially perpendicular to the top and bottom plates 106a, 108a. The plates 106a, 108a, 110a, 112a surround a hollow cavity 114a within the side rail 42a, which assists in reducing the weight of the chassis frame 14.

As shown in FIG. 6, the top plate 106a and the bottom plate 108a each include a first end 116a, 118a and a second end 120a, 122a, respectively. The inner side plate 110a includes a first end 124a permanently coupled to a bottom surface 126a of the top plate 106a at a location 128a between the first end 116a and a center point 130a of the top plate 106a. The inner side plate 110a also includes a second end 132a permanently coupled to a top surface 134a of the bottom plate 108a at a location 136a between the first end 118a and a center point 138a of the bottom plate 108a. Similarly, the outer side plate 112a includes a first end 140a permanently coupled to the bottom surface 126a of the top plate 106a at a location 142a between the second end 120a and the center potion 130a of the top plate 106a. The outer side plate 112a also includes a second end 144a permanently coupled to the top surface 134a of the bottom plate 108a at a location 146a between the second end 122a and the center point 138a of the bottom plate 108a.

In the representative embodiment of the invention, the top plate 106a includes a portion 148a adjacent the first end 116a of the top plate 106a that extends beyond the inner side plate 110a. The top plate 106a include another portion 150a adjacent the second end 120a of the top plate 106a that extends beyond the outer side plate 112a. Likewise, the bottom plate 108a includes a portion 152a adjacent the first end 118a of the bottom plate 108a, which extends beyond the inner side plate 110a, and a portion 154a adjacent the second end 122a of the bottom plate 108a, which extends beyond the outer side plate 112a.

In other embodiments of the invention, the inner and outer side plates 110a, 112a may extend between the top and bottom plates 106a, 108a at their respective ends 116a, 120a, 118a, 122a. In such an embodiment of the invention, the top and bottom plates 106a, 108a would not include portions 148a, 150a, 152a, 154a, respectively.

Now referring to FIG. 7, a cross-sectional view of a side rail 44b from the rear portion 14b of the chassis frame 14 is shown, taken along line 7-7 of FIG. 3. The construction of side rail 44b is similar to the construction of side rail 44a, described above with respect to FIG. 6. The side rail 42b includes a top plate 106b spaced apart from and oriented parallel or substantially parallel to a bottom plate 108b, an inner side plate 110b that extends between and is oriented perpendicular or substantially perpendicular to the top and bottom plates 106b, 108b, and an outer side plate 112b that extends between and is oriented perpendicular or substantially perpendicular to the top and bottom plates 106b, 108b. The plates 106b, 108b, 110b, 112b surround a hollow cavity 114b within the side rail 42b. The hollow cavity 114b assists in reducing the weight of the chassis frame 14.

In the representative embodiment of the invention, the inner side plate 110b includes a first end 124b permanently coupled to a bottom surface 126b of the top plate 106b at a location 128b between a first end 116b and a center point 130b of the top plate 106b. The inner side plate 110b further includes a second end 132b permanently coupled to a top surface 134b of the bottom plate 108b at a location 136b between a first end 118b and a center point 138b of the bottom plate 108b. Meanwhile, the outer side plate 112b includes a first end 140b permanently coupled to the bottom surface 126b of the top plate 106b at a location 142b between a second end 120b and the center potion 130b of the top plate 106b. The outer side plate 112b further includes a second end 144b permanently coupled to the top surface 134b of the bottom plate 108b at a location 146b between a second end 122b and the center point 138b of the bottom plate 108b.

FIG. 7 further illustrates the top plate 106b including a portion 148b adjacent the first end 116b of the top plate 106b, which extends beyond the inner side plate 110b, and another portion 150b adjacent the second end 120b of the top plate 106b, which extends beyond the outer side plate 112b. Similarly, the bottom plate 108b includes a portion 152b adjacent the first end 118b of the bottom plate 108b, which extends beyond the inner side plate 110b, and another portion 154b adjacent the second end 122b of the bottom plate 108b, which extends beyond the outer side plate 112b.

In alternative embodiments of the invention, the inner and outer side plates 110b, 112b may extend between the top and bottom plates 106b, 108b from their ends 116b, 120b, 118b, 122b, respectively. In these embodiment of the invention, the top and bottom plates 106b, 108b would not include respective portions 148b, 150b, 152b, 154b.

A thickness of the top plate 106a may differ than the thickness of the top plate 106b, based on the strength needs at the respective portions 14a, 14b of the chassis frame 14. In addition, a thickness of the bottom plates 108a, 108b may differ to provide even more strength in areas of need. In one embodiment of the invention, the thickness of the top and bottom plates 106a, 108a may be greater than the thickness of the top and bottom plates 106b, 108b, in order to provide the additional strength necessary to support the boom 30 and other components at the front portion 14a of the chassis frame 14. In the representative embodiment of the invention, the thickness of the top and bottom plates 106a, 108a may be 0.25 inch (¼ inch), while the thickness of the top and bottom plates 106b, 108b may be 0.1875 inch (3/16 inch). However, it is also contemplated that the top and bottom plates 106b, 108b may have greater thicknesses than that of top and bottom plates 106a, 108a in other embodiments of the invention. That is, different configurations of components of the sprayer 10 on the chassis frame 14 may result in different strength needs of the chassis frame 14.

In yet other embodiments of the invention, the thickness of the top plates 106a, 106b may be adjusted by adjusting the number of plates welded together to create the top plate 106a, 106b. For example, the top plates 106a, 106b may each include a number of plates welded together to provide the necessary thicknesses and strength, respectively. As such, the thickness of the top plates 106a, 106b may be adjusted at specific locations that require extra strength across the chassis frame 14. In one instance, the top plate 106a may include a greater number of plates than the top plate 106b to provide a greater thickness and strength, while, in other instances, the top plate 106b may include a greater number of plates than the top plate 106a, in other embodiments of the invention.

Figure 8:
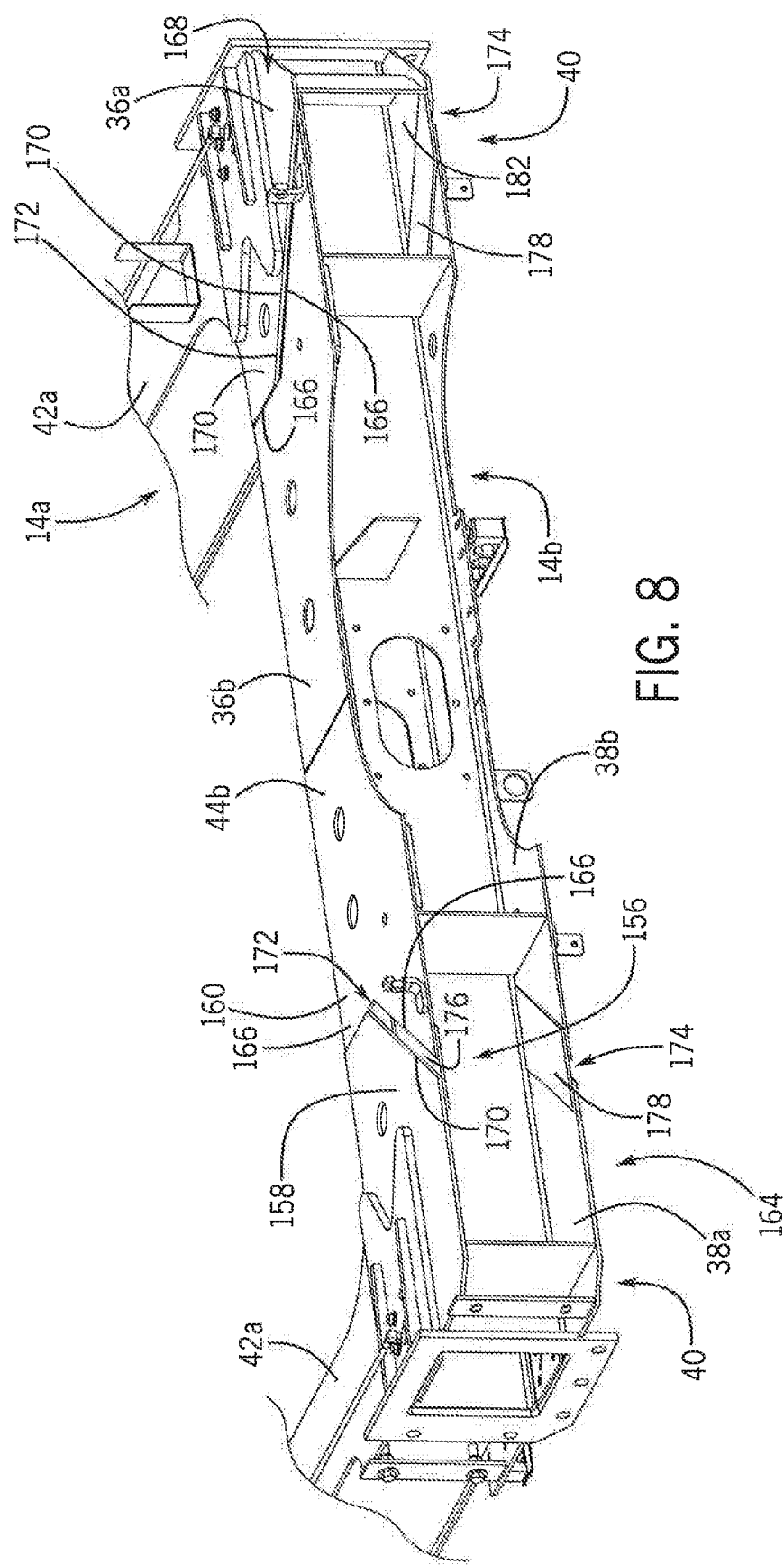
FIG. 8 is an enlarged view of section 9-9 of a transition joint the chassis frame of FIG. 3.

Next, FIG. 8 depicts an enlarged view of the transition joint 40 of the chassis frame 14. The transition joint 40 is formed by the merging of a pocket 156 and a protrusion 158. The pocket 156 is formed adjacent each side rail 42b of the rear portion 14b of the chassis frame 14 at an end 160 of the rear portion 14b adjacent the front portion 14a of the chassis frame 14. The protrusion 158 is formed adjacent each side rail 42a of the front portion 14a of the chassis frame 14 at an end 162 of the front portion 14a adjacent the rear portion 14b of the chassis frame 14.

Adjacent the side rails 42b, each corner 164 of the rear portion 14b of the chassis frame 14 at the end 160 of the rear portion 14b of the chassis frame 14 includes a plurality of angular edges 166. In the representative embodiment of the invention, three (3) angular edges 166 form each pocket 156. In alternative embodiments of the invention, any number of angular edges 166 may be used to form each pocket 156. As shown in FIG. 8, the angular edges 166 adjust the profile of the top and bottom walls 36b, 38b of the rear portion 14b of the chassis frame 14.

Adjacent the side rails 42a, each corner 168 of the front portion 14a of the chassis frame 14 includes a plurality of angular edges 170 forming each protrusion 158. In the representative embodiment of the invention, three (3) angular edges 170 form each protrusion 158. However, any number of angular edges 170 may be used to form each protrusion 158. Similar to the angular edges 166 of the rear portion 14b of the chassis frame 14, the angular edges 170 of the front portion 14b of the chassis frame 14 adjust the profile of the top and bottom walls 36a, 38a of the front portion 14a of the chassis frame 14.

Figure 9:
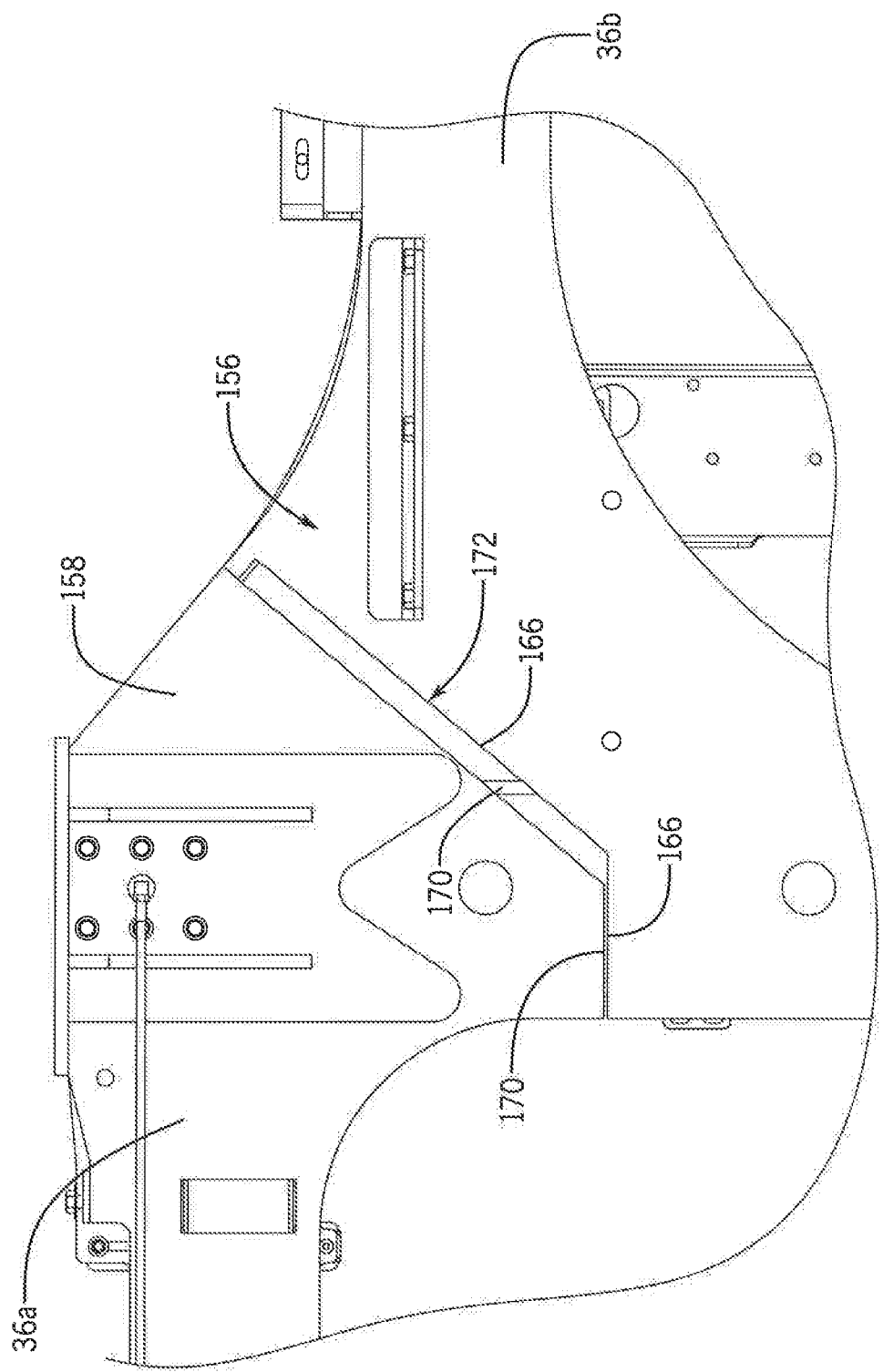
FIG. 9 is a cross-sectional view of the transition joints of the chassis frame of FIG. 3 taken along line 9-9.

FIG. 9 depicts a cross-sectional view of the transition joint 40. As shown in the representative embodiment of the invention, the front and rear portions 14a, 14b of the chassis frame 14 are aligned at the transition joints 40 so that angular edges 166, 170 align with each other. In addition, the front and rear portions 14a, 14b are aligned so that the bottom surfaces 70 of the top plates 56 and the bottom surfaces 126 of the top plates 106 are aligned along the same horizontal plane. Similarly, the front and rear portions 14a, 14b are aligned so that the top surfaces 78 of the bottom plates 58 and the top surfaces 134 of the bottom plates 108 are aligned along the same horizontal plane.

As the angular edges 166, 170 are aligned and brought together so that the pocket 156 and protrusion 158 may engage each other, an upper seam 172 is created in the top wall 36 and a lower seam 174 is created in the bottom wall 38 where the angular edges 166 come together. As shown in FIG. 9, the angular edges 166, 170 may be flush against each other or spaced apart from each other along the seams 172, 174. Further, whether the angular edges 166, 170 are flush against each other or spaced apart from each may vary across the length of the seams 172, 174.

In the representative embodiment of the invention, an upper joining plate 176 is disposed on the bottom surface 180 of the top wall 36 of the chassis frame 14 along the upper seam 172. The upper joining plate 176 may be disposed along the entirety of the upper seam 172 or only a portion of the upper seam 172. Similarly, a lower joining plate 178 may be disposed on the top surface 182 of the bottom wall 38 of the chassis frame 14 along the lower seam 174. The lower joining plate 178 may also be disposed along the entirety of the lower seam 174 or only a portion of the lower seam 174.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A chassis frame of an agricultural sprayer comprising:
a first section comprising:
a top plate having a first thickness;
a bottom plate spaced apart from the top plate; and
a plurality of side plates extending from the top plate to the bottom plate;
a second section comprising:
a top plate having a second thickness;
a bottom plate spaced apart from the top plate; and
a plurality of side plates extending from the top plate to the bottom plate;
wherein the first section and the second section are joined at least one transition joint, each transition joint comprising:
a pocket defined by angular edges of the top and bottom plates of the first section;
a protrusion defined by angular edges of the top and bottom plates of the second section, the protrusion configured to engage the pocket;
a first joining plate is disposed along a first seam between the angular edge of the top plate of the first section and the angular edge of the top plate of the second section, the first joining plate including an upper surface interconnected to a lower surface of the top plate of the first section and to a lower surface of the top place of the second section to couple together the rear portion of the chassis frame and the front portion of the chassis frame; and
a second joining plate is disposed along a second seam between the angular edge of the bottom plate of the first section and the angular edge of the bottom plate of the second section, the second joining plate including a lower surface interconnected to an upper surface of the bottom plate of the first section and to an upper surface of the bottom place of the second section to couple together the rear portion of the chassis frame and the front portion of the chassis frame.

2. The chassis frame of claim 1 wherein the angular edges of the top and bottom plates of the first section are aligned with the angular edges of the top and bottom plates of the second section so as to be in contact with each other.

3. The chassis frame of claim 1 wherein the first thickness is greater than the second thickness.

4. The chassis frame of claim 3 wherein the first thickness is 0.25 inch.

5. The chassis frame of claim 3 wherein the second thickness is 0.1875 inch.

6. The chassis frame of claim 1 wherein the first section of the chassis frame is a portion of the chassis frame supporting a boom of the agricultural sprayer.

7. The chassis frame of claim 1 wherein the second section of the chassis frame is a portion of the chassis frame supporting an engine compartment of the agricultural sprayer.

8. A method of manufacturing a chassis frame for an agricultural sprayer comprising:
   forming a first section of the chassis frame, wherein forming the first section comprises:
      providing a top plate having a first thickness;
      providing a bottom plate spaced apart from the top plate; and
      coupling a plurality of side plates to the top plate at a first end and orienting the plurality of side plates to extend between the top plate and the bottom plate;
   forming a second section of the chassis frame, wherein forming the second section comprises:
      providing a top plate having a second thickness;
      providing a bottom plate spaced apart from the top plate; and
      coupling a plurality of side plates to the top plate at a first end and orienting the plurality of side plates to extend between the top plate and the bottom plate; and
   joining the first section and the second section at a transition point formed by angular edges of the top and bottom plates of the first section aligned with angular edges of the top and bottom plates of the second section, wherein joining the first section and the second section at a transition point comprises:
      creating a transition point pocket defined by the angular edges of the top and bottom plates of the second section of chassis frame;
      creating a transition point protrusion defined by the angular edges of the top and bottom plates of the first section of chassis frame;
      engaging the transition point protrusion with the transition point pocket;
      aligning the angular edges of the top and bottom plates of the transition point pocket with the angular edges of the top and bottom plates transition point protrusion to form a seam between the angular edges;
      coupling the top plate of the transition point pocket to the top plate of the transition point protrusion by way of fixing an upper joining plate to bottom surfaces of the top plates; and
      coupling the bottom plate of the transition point pocket to the bottom plate of the transition point protrusion by way fixing a lower joining plate to top surfaces of the bottom plates.

9. The method of claim 8 wherein the first thickness is greater than the second thickness.

10. The method of claim 8 wherein the first thickness is 0.25 inch.

11. The method of claim 8 wherein the second thickness is 0.1875 inch.

12. A chassis frame comprising:
   a front portion of the chassis frame comprising:
      a top plate having a first thickness;
      a bottom plate spaced apart from the top plate; and
      a plurality of side plates extending from the top plate to the bottom plate;
   a rear portion of the chassis frame coupled to the front portion of the chassis frame at at least one transition joint, the rear portion comprising:
      a top plate having a second thickness less than the first thickness;
      a bottom plate spaced apart from the top plate; and
      a plurality of side plates extending from the top plate to the bottom plate;
   wherein each transition joint comprises:
      a pocket defined by angular edges of the rear portion of the chassis frame; and
      a protrusion defined by angular edges of the front portion of the chassis frame, the protrusion configured to engage the pocket;
      a first joining plate is disposed along a first seam between the angular edge of the top plate of the front section and the angular edge of the top place of the rear section, the first joining plate including an upper surface interconnected to a lower surface of the top plate of the front section and to a lower surface of the top place the rear section to couple together the rear portion of the chassis frame and the front portion of the chassis frame; and
      a second joining plate is disposed along a second seam between the angular edge of the bottom plate of the front section and the angular edge of the bottom plate of the rear section, the second joining plate including a lower surface interconnected to an upper surface of the bottom plate of the front section and to an upper surface of the bottom place of the rear section to couple together the rear portion of the chassis frame and the front portion of the chassis frame.

13. The chassis frame of claim 12 wherein:
   the pocket of each transition joint is formed at a corner of the rear portion of the chassis frame at an end of the front portion of the chassis frame adjacent the front portion of the chassis frame; and
   the protrusion of each transition joint is formed at a corner of the front portion of the chassis frame at an end of the front portion of the chassis frame adjacent the rear portion of the chassis frame.

14. The chassis frame of claim 12 wherein the first thickness is 0.25 inch.

15. The chassis frame of claim 12 wherein the second thickness is 0.1875 inch.

16. The chassis frame of claim 12 wherein:
   a thickness of the bottom plate of the front portion of the chassis is equal to the first thickness; and
a thickness of the bottom plate of the rear portion of the chassis is equal to the second thickness.

* * * * *